United States Patent
Domingo et al.

(10) Patent No.: US 10,933,694 B2
(45) Date of Patent: Mar. 2, 2021

(54) TIRE FOR VEHICLE OF CONSTRUCTION PLANT TYPE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Alain Domingo, Clermont-Ferrand (FR); Emmanuel Clement, Clermont-Ferrand (FR); Pascal Ragot, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 736 days.

(21) Appl. No.: 15/304,976

(22) PCT Filed: Apr. 22, 2015

(86) PCT No.: PCT/EP2015/058714
§ 371 (c)(1),
(2) Date: Oct. 18, 2016

(87) PCT Pub. No.: WO2015/162176
PCT Pub. Date: Oct. 29, 2015

(65) Prior Publication Data
US 2017/0203613 A1    Jul. 20, 2017

(30) Foreign Application Priority Data
Apr. 22, 2014   (FR) ...................................... 1453593

(51) Int. Cl.
*B60C 9/20* (2006.01)

(52) U.S. Cl.
CPC .............. *B60C 9/20* (2013.01); *B60C 9/2006* (2013.01); *B60C 2009/209* (2013.01);
(Continued)

(58) Field of Classification Search
CPC ....................................................... B60C 9/20
(Continued)

(56) References Cited

U.S. PATENT DOCUMENTS

| 5,318,643 A |   | 6/1994 | Mizner et al. ................ 152/527 |
| 5,637,163 A | * | 6/1997 | Kobayashi ................ B60C 9/20 |
| | | | 152/526 |

(Continued)

FOREIGN PATENT DOCUMENTS

| EP | 0 383 716 A1 | 8/1990 |
| EP | 0 602 733 A1 | 6/1994 |

(Continued)

OTHER PUBLICATIONS

English machine translation of JP03-220002. (Year: 1991).*
(Continued)

*Primary Examiner* — Robert C Dye
(74) *Attorney, Agent, or Firm* — Venable LLP

(57) ABSTRACT

The tire for a construction plant vehicle includes a tread and a crown reinforcement arranged radially internal to the tread. The crown reinforcement includes a protective reinforcement, a working reinforcement, and a hoop reinforcement. The protective reinforcement includes at least one protective ply that exhibits a force at break $Fm_{NSP}$. The working reinforcement includes at least one working ply that exhibits a force at break $Fm_{NST}$. The hoop reinforcement includes at least one hooping ply, each of which includes hoop reinforcing elements that make an angle at most equal to 10° with a circumferential direction of the tire. The working reinforcement is arranged radially internal to the protective (Continued)

reinforcement. A ratio $Fm_{NSP}/Fm_{NST}$ is greater than or equal to 0.27 and less than or equal to 0.90.

22 Claims, 1 Drawing Sheet

(52) U.S. Cl.
CPC ............... *B60C 2009/2016* (2013.01); *B60C 2009/2019* (2013.01); *B60C 2009/2048* (2013.01); *B60C 2009/2058* (2013.01); *B60C 2009/2077* (2013.01); *B60C 2009/2083* (2013.01); *B60C 2200/065* (2013.01)

(58) Field of Classification Search
USPC ........................................................ 152/535
See application file for complete search history.

(56) References Cited

U.S. PATENT DOCUMENTS

| | | | | |
|---|---|---|---|---|
| 5,688,344 | A | 11/1997 | Kobayashi et al. | 152/527 |
| 6,578,611 | B2* | 6/2003 | Nakata | B60C 9/2009 |
| | | | | 152/209.14 |
| 6,817,395 | B2 | 11/2004 | Sinopoli et al. | 152/527 |
| 7,168,469 | B2* | 1/2007 | Kobayashi | B60C 9/2009 |
| | | | | 152/526 |
| 2001/0023730 | A1* | 9/2001 | Sinopoli | B60C 9/0007 |
| | | | | 152/526 |
| 2004/0089391 | A1 | 5/2004 | Jallais et al. | 152/527 |
| 2006/0237110 | A1 | 10/2006 | Barguet et al. | 152/451 |
| 2008/0110545 | A1* | 5/2008 | Kobayashi | B60C 9/2006 |
| | | | | 152/527 |
| 2010/0276050 | A1* | 11/2010 | Minoli | B60C 9/2006 |
| | | | | 152/454 |
| 2012/0227885 | A1* | 9/2012 | Cheng | D07B 1/0613 |
| | | | | 152/451 |
| 2013/0199690 | A1* | 8/2013 | Barguet | D02G 3/02 |
| | | | | 152/527 |
| 2015/0136295 | A1 | 5/2015 | Barguet et al. | B60C 9/0007 |
| 2015/0159325 | A1 | 6/2015 | Barquet et al. | D07B 5/12 |
| 2015/0251497 | A1* | 9/2015 | Ferlin | B60C 9/0007 |
| | | | | 152/535 |
| 2015/0329995 | A1 | 11/2015 | Clement et al. | D02G 3/38 |
| 2017/0182846 | A1 | 6/2017 | Clement et al. | |

FOREIGN PATENT DOCUMENTS

| | | | |
|---|---|---|---|
| FR | 2990963 | * | 11/2013 |
| FR | 2995822 | * | 3/2014 |
| JP | 03-220002 | * | 9/1991 |
| JP | H07-108602 B2 | | 11/1995 |
| JP | H09-143890 A | | 6/1997 |
| JP | H11-021775 | * | 1/1999 |
| JP | 2009-06321 A | | 4/2009 |
| JP | 2009-067321 A | | 4/2009 |
| WO | WO 02/090135 A1 | | 11/2002 |
| WO | WO 2013/174896 A1 | | 11/2013 |

OTHER PUBLICATIONS

English machine translation of JP H11-021775. (Year: 1999).*
E. Clement, U.S. Appl. No. 15/304,933, filed Apr. 22, 2015.
International Search Report issued by WIPO dated Jul. 20, 2015, in connection with International Application No. PCT/EP2015/058714 (with English translation attached).
Jul. 20, 2015 International Search Report and Written Opinion in International Patent Appln. No. PCT/EP2015/058714.

* cited by examiner

TIRE FOR VEHICLE OF CONSTRUCTION PLANT TYPE

FIELD OF THE INVENTION

The invention relates to a tire, notably for construction plant vehicles.

RELATED ART

A tire for a construction plant vehicle, having a radial carcass reinforcement comprising a tread, two inextensible beads, two sidewalls connecting the beads to the tread and a crown reinforcement, disposed circumferentially between the carcass reinforcement and the tread, is known from the prior art. This crown reinforcement comprises several rubber plies, possibly reinforced with reinforcing elements such as metal cords.

The crown reinforcement comprises at least two superposed plies, known as working plies, the reinforcing cords of which are disposed virtually parallel to one another within a ply but are crossed from one ply to the other, that is to say inclined, symmetrically or asymmetrically, with respect to the median circumferential plane, at an angle which is generally between 15° and 40° depending on the type of tire in question.

The crown reinforcement also comprises one or more plies, known as protective plies, that are intended to protect the rest of the crown reinforcement from external attack, notably perforations.

In this type of tire, the crown reinforcement can also comprise further plies, for example plies known as hooping plies that comprise cords oriented substantially in the circumferential direction (also known as zero degree plies), regardless of whether they are radially on the outside or inside with respect to the working plies.

Such a tire is subjected to numerous attacks. This is because this type of tire is usually run over an uneven road surface comprising indenting features, for example stones that sometimes have a size of the order of several tens of centimetres.

In the presence of indenting features that exert excessive stress on the crown reinforcement of the tire, the breakage of the cords of the working plies is observed, rendering the tire unusable.

Tire designers have, thus far, attempted to remedy the problem of breakage of the cords of the working plies by reinforcing them mechanically.

One solution consists in the use, within the working plies, of metal cords that exhibit high forces at break, and notably in the use of metal cords with a larger diameter.

However, the use of working plies comprising metal cords with a larger diameter causes, on account of the great thickness thereof, significant shear stresses at the edges of the working plies, between these working plies and the adjacent masses of rubber. These shear stresses result in pockets of cleavage which result in the separation of the working plies and the adjacent masses of rubber.

Moreover, the use of metal cords with larger diameters causes an increase in the stiffness of the edges of the working plies, thereby reducing the aptitude of each working ply to follow the rounded shape imposed by the blank on which each working ply is deposited while the tire is being manufactured.

BRIEF DESCRIPTION OF EMBODIMENTS OF THE INVENTION

The aim of the invention is therefore to indirectly reinforce the working plies so as to make them more resistant to indenting features. In other words, the aim of the invention is to increase the mechanical strength of the working plies with respect to indenting features while limiting the increase in mechanical strength conferred on these working plies.

To this end, the subject of the invention is a tire comprising a tread and a crown reinforcement arranged radially on the inside of the tread, the crown reinforcement comprising:
- a protective reinforcement comprising at least one protective ply that exhibits a force at break $Fm_{NSP}$;
- a working reinforcement comprising at least one working ply that exhibits a force at break $Fm_{NST}$, the working reinforcement being arranged radially on the inside of the protective reinforcement; and
- a hoop reinforcement comprising at least one hooping ply, the hooping ply comprising reinforcing elements known as hoop reinforcing elements, the hoop reinforcing elements making an angle at most equal to 10° with the circumferential direction of the tire, and wherein the ratio $Fm_{NSP}/Fm_{NST}$ is greater than or equal to 0.27.

The inventors originating the invention found that the working plies were not significantly more resistant to stresses exerted by the indenting features, even if they were more robust. Thus, the inventors found that the mechanical reinforcement of the protective reinforcement associated with a hoop reinforcement made it possible to indirectly obtain an improvement in the resistance of the working plies to stresses exerted on the tire by the indenting features, in contrast to just the direct reinforcement of the working plies.

The presence of a hoop reinforcement makes it possible, surprisingly, to improve the resistance of the working plies, in contrast to what a person skilled in the art could have expected. This is because, since the hoop reinforcement has the effect of stiffening the crown of the tire, earlier breakage of the working plies could have been expected on account of the reduced deformability of the crown of the tire under the effect of the indenting features. However, as the results of the comparative tests collated below show, the presence of a hoop reinforcement associated with a ratio $Fm_{NSP}/Fm_{NST}$ greater than or equal to 0.27 indirectly allows an improvement in the resistance of the working plies to the stresses exerted on the tire by the indenting features.

Advantageously, the ratio $Fm_{NSP}/Fm_{NST}$ is greater than or equal to 0.30, preferably greater than or equal to 0.35, more preferably greater than or equal to 0.41 and even more preferably greater than or equal to 0.50.

Advantageously, the ratio $Fm_{NSP}/Fm_{NST}$ is less than or equal to 0.90, preferably less than or equal to 0.70.

In a preferred embodiment of the invention, each protective ply exhibits a force at break $Fm_{NSP}$ greater than or equal to 1300 daN·cm$^{-1}$, preferably greater than or equal to 1400 daN·cm$^{-1}$, more preferably greater than or equal to 1500 daN·cm$^{-1}$ and even more preferably greater than or equal to 1600 daN·cm$^{-1}$.

Such forces at break of the protective plies can be obtained by varying numerous parameters.

In one embodiment, with each protective ply comprising reinforcing elements known as protective reinforcing elements, each protective reinforcing element exhibits a force at break greater than or equal to 3000 N, preferably greater than or equal to 3500 N, more preferably greater than or equal to 4500 N and even more preferably greater than or equal to 5500 N. One of the abovementioned parameters is the individual force at break of each reinforcing element or cord.

In another embodiment, with each protective ply comprising reinforcing elements known as protective reinforcing elements, the pitch at which the protective reinforcing elements are laid ranges from 1.2 to 6.5 mm, preferably from 2.5 to 5.0 mm, and more preferably from 3.5 to 4.5 mm. Another of the abovementioned parameters is the laying pitch. The shorter this is, the greater the density of reinforcing elements and the higher the value of force at break of the ply. However, a reinforcing element density that is too high is detrimental to the weight of the tire. On the other hand, a reinforcing element density that is too low allows the penetration of solid bodies and the passage of these bodies between two adjacent reinforcing elements.

The reinforcing elements of the protective, working and hooping plies are, within one and the same ply, arranged side by side parallel to one another in a main direction substantially perpendicular to the overall direction in which these reinforcing elements extend. The pitch is the distance, in the main direction, between two analogous points on two adjacent reinforcing elements, that is to say the axis-to-axis distance between two adjacent reinforcing elements.

In one embodiment, each working ply exhibits a force at break $Fm_{NST}$ greater than or equal to 2000 daN·cm$^{-1}$, preferably greater than or equal to 2500 daN·cm$^{-1}$, more preferably greater than or equal to 3000 daN·cm$^{-1}$ and even more preferably greater than or equal to 4000 daN·cm$^{-1}$.

In one embodiment, with each working ply comprising reinforcing elements known as working reinforcing elements, each working reinforcing element exhibits a force at break greater than or equal to 15 000 N, preferably greater than or equal to 20 000 N and more preferably greater than or equal to 25 000 N.

In another embodiment, with each working ply comprising reinforcing elements known as working reinforcing elements, the pitch at which the working reinforcing elements are laid ranges from 2.5 to 7.5 mm, preferably from 3.0 to 7.0 mm, and more preferably from 3.5 to 6.5 mm.

In one embodiment, the protective reinforcement is interposed radially between the tread and the working reinforcement.

According to an optional characteristic of the tire, with each protective ply comprising reinforcing elements known as protective reinforcing elements, the protective reinforcing elements make an angle at least equal to 10°, preferably in the range from 10° to 35° and more preferably from 15° to 35°, with the circumferential direction of the tire.

According to another optional characteristic of the tire, with each working ply comprising reinforcing elements known as working reinforcing elements, the working reinforcing elements make an angle at most equal to 60°, preferably in the range from 15° to 40°, with the circumferential direction of the tire.

Advantageously, the hoop reinforcing elements make an angle in the range from 5° to 10° with the circumferential direction of the tire.

In a preferred embodiment of the invention, each hooping ply exhibits a force at break $Fm_{NSF}$ greater than or equal to 1300 daN·cm$^{-1}$, preferably greater than or equal to 1500 daN·cm$^{-1}$, more preferably greater than or equal to 1800 daN·cm$^{-1}$ and even more preferably greater than or equal to 2000 daN·cm$^{-1}$.

In one embodiment, each hoop reinforcing element exhibits a force at break greater than or equal to 2500 N, preferably greater than or equal to 4000 N, more preferably greater than or equal to 6000 N and even more preferably greater than or equal to 8500 N.

In another embodiment, the pitch at which the hoop reinforcing elements are laid ranges from 1.8 to 6.5 mm, preferably from 3.0 to 5.5 mm, and more preferably from 3.7 to 4.8 mm.

In one embodiment, the hoop reinforcement is arranged radially on the inside of the working reinforcement.

Advantageously, the tire comprises a crown surmounted by the tread, two sidewalls, two beads, each sidewall connecting each bead to the crown, and a carcass reinforcement that is anchored in each of the beads and extends through the sidewalls towards the crown.

In a preferred embodiment, the carcass reinforcement is arranged radially on the inside of the crown reinforcement.

Advantageously, the carcass reinforcement comprises at least one carcass ply comprising reinforcing elements known as carcass reinforcing elements, the carcass reinforcing elements making an angle greater than or equal to 65°, preferably greater than or equal to 80° and more preferably in the range from 80° to 90° with respect to the circumferential direction of the tire.

In a preferred embodiment, the tire has a size of the W R U type, in which U≥35, preferably U≥49 and more preferably U≥57. In a preferred embodiment, the protective reinforcement comprises several protective plies, at least one of which, and even more preferably each of which, exhibits a force at break $Fm_{NSP}$ such that the ratio $Fm_{NSP}/Fm_{NST}$ is greater than or equal to 0.27.

In another preferred embodiment, the working reinforcement comprises several working plies, at least one of which, and even more preferably each of which, exhibits a force at break $Fm_{NST}$ such that the ratio $Fm_{NSP}/Fm_{NST}$ is greater than or equal to 0.27.

In another, even more preferred embodiment, with the protective reinforcement comprising several protective plies and the working reinforcement comprising several working plies, at least one protective ply, and more preferably each protective ply, exhibits a force at break $Fm_{NSP}$ and at least one working ply, and more preferably each working ply, exhibits a force at break $Fm_{NST}$ such that the ratio $Fm_{NSP}/Fm_{NST}$ is greater than or equal to 0.27.

Preferably, each protective and/or working reinforcing element is a filamentary element. A filamentary element is understood to mean any longilinear element of great length relative to its cross section, whatever the shape of the latter, for example circular, oblong, rectangular or square, or even flat, it being possible for this filamentary element to be rectilinear or non-rectilinear, for example twisted, or wavy.

Preferably, the protective and/or working reinforcing elements are metallic. Metallic is understood by definition to mean a reinforcing element the mass of which is made up predominantly (i.e. more than 50% of these wires) or entirely (100% of the wires) of a metallic material, for example steel.

Even more preferably, the protective and/or working reinforcing elements are metal cords comprising several individual metal threads. By definition, an individual metal thread is understood to mean a monofilament made up predominantly (i.e. more than 50% of its mass) or entirely (100% of its mass) of a metallic material. Each monofilament is preferably made of steel, more preferably pearlitic (or ferritic-pearlitic) carbon steel referred to as "carbon steel" below, or else made of stainless steel (by definition steel comprising at least 11% chromium and at least 50% iron).

When a carbon steel is used, its carbon content (% by weight of steel) is preferably between 0.5% and 0.9%. Use is preferably made of a steel of the normal tensile (NT), high tensile (HT) or super high tensile (SHT) steel cord type, the tensile strength (Rm) of which is preferably greater than 2500 MPa, more preferably greater than 3000 MPa and even more preferably 3500 MPa (measurement carried out under traction as per the standard ISO 6892-1, 2009).

In a preferred embodiment, each individual metal thread has a diameter in the range from 0.10 mm to 0.35 mm.

As far as the reinforcing elements are concerned, the measurements of the force at break denoted Fr (maximum load in N) are carried out under traction as per the standard ISO 6892-1, October 2009, on reinforcing elements removed from tires, preferably substantially new ones, comprising rubber of the tire. As far as the plies of reinforcing elements are concerned, the force at break of the ply, denoted Fm, is obtained by dividing the force at break Fr by the laying pitch.

In the present application, any range of values denoted by the expression "between a and b" represents the range of values from more than a to less than b (that is to say excluding the end points a and b), whereas any range of values denoted by the expression "from a to b" means the range of values from the end point "a" as far as the end-point "b", namely including the strict end points "a" and "b".

BRIEF DESCRIPTION OF THE DRAWINGS

The invention will be better understood from reading the following description, given solely by way of non-limiting example and with reference to the drawings in which.

DETAILED DESCRIPTION OF EMBODIMENTS OF THE INVENTION

Example of Tires According to the Invention

In the following description, when the term "radial" is used, it is appropriate to make a distinction between several different uses of the word by a person skilled in the art. Firstly, the expression refers to a radius of the tire. It is within this meaning that a point, ply or reinforcement P1 is said to be "radially inside" a point, ply or reinforcement P2 (or "radially on the inside" of the point P2) if it is closer to the rotation axis of the tire than the point, ply or reinforcement P2. Conversely, a point, ply or reinforcement P3 is said to be "radially outside" a point, ply or reinforcement P4 (or "radially on the outside" of the point, ply or reinforcement P4) if it is further away from the rotation axis of the tire than the point, ply or reinforcement P4. Progress will be said to be "radially inwards (or outwards)" when it is in the direction of smaller (or larger) radii. It is this sense of the word that applies also when radial distances are being discussed.

On the other hand, a reinforcing element or a reinforcement is said to be "radial" when the reinforcing element or the reinforcing elements of the reinforcement make an angle greater than or equal to 65° and less than or equal to 90° with the circumferential direction.

An "axial" direction is a direction parallel to the axis of rotation of the tire. A point, ply or reinforcement P5 is said to be "axially inside" a point, ply or reinforcement P6 (or "axially on the inside" of the point, ply or reinforcement P6) if it is closer to the median plane M of the tire than the point, ply or reinforcement P6. Conversely, a point, ply or reinforcement P7 is said to be "axially outside" a point P8 (or "axially on the outside" of the point, ply or reinforcement P8) if it is further away from the median plane M of the tire than the point, ply or reinforcement P8. The "median plane" M of the tire is the plane which is normal to the axis of rotation of the tire and which is situated equidistantly from the annular reinforcing structures of each bead.

A "circumferential" direction is a direction which is perpendicular both to a radius of the tire and to the axial direction.

A frame of reference X, Y, Z corresponding to the usual axial, radial and circumferential orientations, respectively, of a tire has been depicted in the figures.

Figure 1:
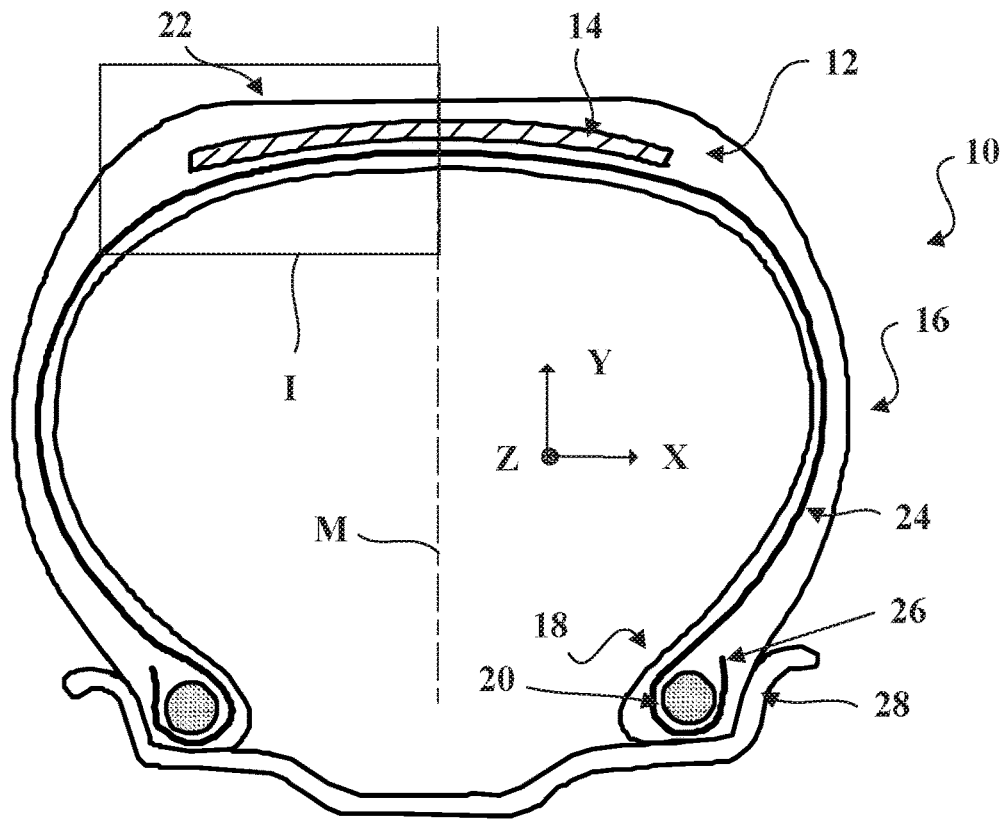
FIG. 1 is a simplified view in section of a tire according to the invention.
Figure 2:
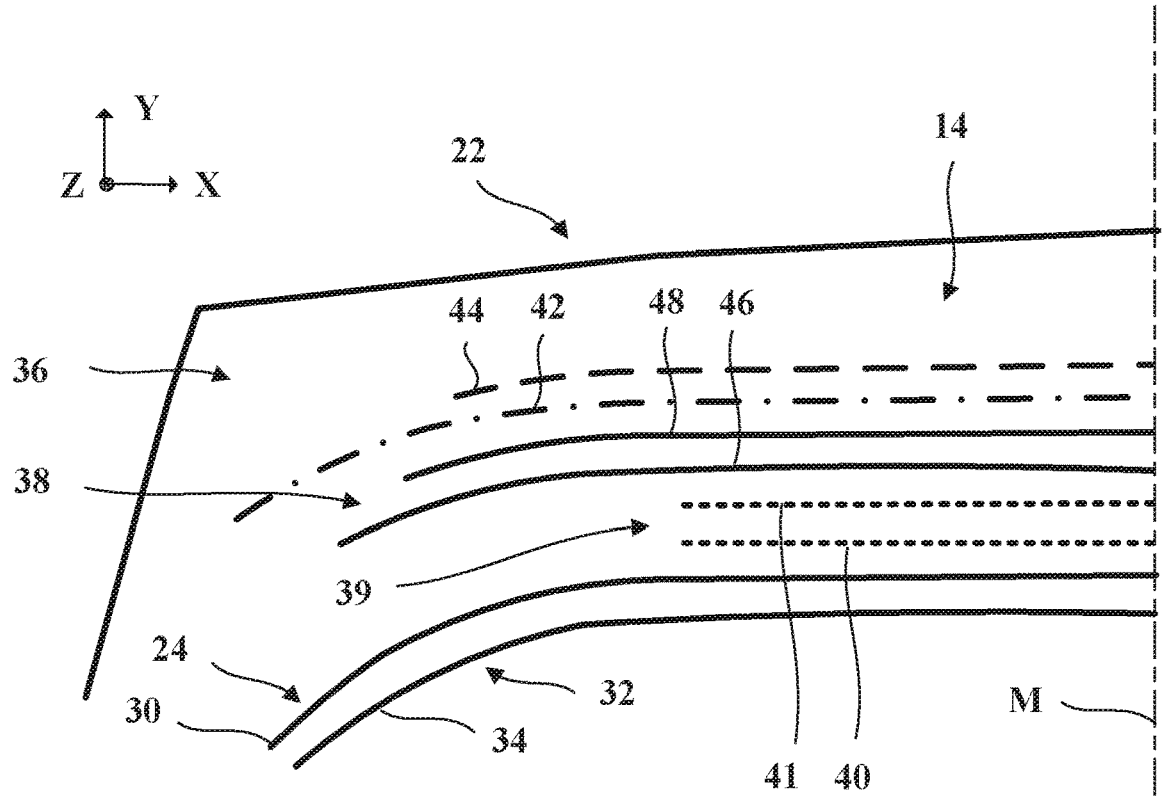
FIG. 2 is a detail view of the part I of the tire in FIG. 1.

FIGS. 1 and 2 show a tire for a construction plant-type vehicle, for example of the "dumper" type, denoted by the overall reference 10. Thus, the tire 10 has a size of the W R U type, for example 40.00 R 57 or 59/80 R 63.

In a manner known to a person skilled in the art, W:
when it is in the form H/B, denotes the nominal aspect ratio H/B as defined by the ETRTO (H being the height of the section of the tire and B being the width of the section of the tire) and,
when it is in the form H.00 or B.00, in which H=B, H and B being as defined above. U represents the diameter, in inches, of the rim seat on which the tire is intended to be mounted, and R denotes the type of carcass reinforcement of the tire, in this case radial. U≥35, preferably U≥49 and more preferably U≥57.

The tire 10 has a crown 12 reinforced by a crown reinforcement 14, two sidewalls 16 and two beads 18, each of these beads 18 being reinforced with a bead wire 20. The crown 12 is surmounted by a tread 22. The crown reinforcement 14 is arranged radially on the inside of the tread 22. A carcass reinforcement 24, arranged radially on the inside of the crown reinforcement 14, is anchored in each bead 18, in this case wrapped around each bead wire 20 and comprises a turn-up 26 disposed towards the outside of the tire 10, which is shown mounted on a rim 28 here.

The carcass reinforcement 24 comprises at least one carcass ply 30 comprising reinforcing elements known as carcass reinforcing elements (not shown). The carcass reinforcing elements make an angle greater than or equal to 65°, preferably greater than or equal to 80° and more preferably in the range from 80° to 90°, with respect to the circumferential direction of the tire. The carcass reinforcing elements are arranged substantially parallel to one another and extend from one bead 18 to the other. Examples of such carcass reinforcing elements are described in the documents EP0602733 and also EP0383716.

The tire 10 also comprises a sealing ply 32 made up of an elastomer (commonly known as "inner liner") which defines the radially internal face 34 of the tire 10 and which is intended to protect the carcass ply 30 from the diffusion of air coming from the space inside the tire 10.

The crown reinforcement 14 comprises, radially from the outside to the inside of the tire 10, a protective reinforcement 36 arranged radially on the inside of the tread 22, a working reinforcement 38 arranged radially on the inside of the protective reinforcement 36 and a hoop reinforcement 39 arranged radially on the inside of the working reinforcement 38. Thus, the protective reinforcement 36 is interposed radially between the tread 22 and the working reinforcement 38.

The protective reinforcement 36 comprises first and second protective plies 42, 44, the first protective ply 42 being arranged radially on the inside of the second protective ply 44.

The working reinforcement 38 comprises first and second working plies 46, 48, the first working ply 46 being arranged radially on the inside of the second working ply 48.

The hoop reinforcement 39, also known as limiting block, the function of which is to partially absorb the mechanical stresses due to inflation, comprises first and second hooping plies 40, 41, the first hooping ply 40 being arranged radially on the inside of the second hooping ply 41.

Protective Reinforcement

The first and second protective plies 42, 44 comprise reinforcing elements known as protective reinforcing elements (not shown). In this case, the reinforcing elements of each first and second protective ply 42, 44 are identical. In this case, each protective reinforcing element of the protective reinforcement 36 comprises a metal cord. The protective reinforcing elements are arranged side by side parallel to one another in a main direction substantially perpendicular to the overall direction in which these reinforcing elements extend. The protective reinforcing elements are crossed from one protective ply 42, 44 to the other.

Each protective reinforcing element, in this case the overall direction in which these reinforcing elements extend, makes an angle at least equal to 10°, preferably in the range from 10° to 35° and more preferably from 15° to 35°, with the circumferential direction Z of the tire 10. In this case, the angle is equal to 24°.

In this case, each protective reinforcing element is a metal cord of the type 52.26 for example as described in the document FR 2 959 517. This cord has a structure K×(M+P), where K=4, M=4 and P=9 in this case, comprising a single layer made of up K strands, each strand comprising:
- an internal layer of the strand made up of M internal thread(s) and
- an external layer of the strand made up of N external threads wrapped helically around the internal layer of the strand.

Each individual metal thread has a diameter in the range from 0.10 mm to 0.35 mm and in this case equal to 0.26 mm.

Each protective reinforcing element exhibits a force at break Fr greater than or equal to 3000 N, preferably greater than or equal to 3500 N, more preferably greater than or equal to 4500 N and more preferably greater than or equal to 5500 N. In this case, the force at break of the cord 52.26 is equal to 6038 N.

The pitch at which the protective reinforcing elements of each protective ply 42, 44 are laid ranges from 1.2 to 6.5 mm, preferably from 2.5 to 5.0 mm, and more preferably from 3.5 to 4.5 mm and in this case is equal to 3.7 mm.

Each protective ply 42, 44 exhibits a force at break $Fm_{NSP1}$, $Fm_{NSP2}$, respectively, greater than or equal to 1300 $daN \cdot cm^{-1}$, preferably greater than or equal to 1400 $daN \cdot cm^{-1}$, more preferably greater than or equal to 1500 $daN \cdot cm^{-1}$ and even more preferably greater than or equal to 1600 $daN \cdot cm^{-1}$ and in this case $Fm_{NSP1} = Fm_{NSP2} = Fm_{NSP} = 1632\ daN \cdot cm^{-1}$.

Working Reinforcement

The first and second working plies 46, 48 comprise reinforcing elements known as working reinforcing elements (not shown). In this case, the reinforcing elements of each first and second working ply 46, 44 are identical. In this case, each working reinforcing element of the working reinforcement 38 comprises a metal cord. The working reinforcing elements are arranged side by side parallel to one another in a main direction substantially perpendicular to the overall direction in which these reinforcing elements extend. The working reinforcing elements are crossed from one working ply 46, 48 to the other.

Each working reinforcing element, in this case the overall direction in which these reinforcing elements extend, makes an angle at most equal to 60°, preferably in the range from 15° to 40°, with the circumferential direction Z of the tire 10. In this case, the angle of the reinforcing elements of the first working ply is equal to 19° and the angle of the reinforcing elements of the second working ply is equal to 33°.

In this case, each working reinforcing element is a metal cord of the type 84.26. This cord has a structure (J+Q)×(A+B), where J=1, Q=6, A=3 and B=9, and comprises:
- an internal layer of the cord made up of J internal strand(s),
- an external layer of the cord made up of Q external strands wrapped helically around the internal layer of the cord,
- each internal and external strand comprising:
- an internal layer of the strand made up of A internal thread(s) and
- an external layer of the strand made up of B external threads wrapped helically around the internal layer of the strand.

Each individual metal thread has a diameter in the range from 0.10 mm to 0.35 mm and in this case equal to 0.26 mm.

Each working reinforcing element 84.26 exhibits a force at break Fr equal to 12 251 N.

The pitch at which the working reinforcing elements of each working ply 46, 48 are laid ranges from 2.5 to 7.5 mm, preferably from 3.0 to 7.0 mm, and more preferably from 3.5 to 6.5 mm and in this case is equal to 3.8 mm.

Each working ply 46, 48 exhibits a force at break $Fm_{NST1}$, $Fm_{NST2}$, respectively, greater than or equal to 2000 $daN \cdot cm^{-1}$, preferably greater than or equal to 2500 $daN \cdot cm^{-1}$, more preferably greater than or equal to 3000 $daN \cdot cm^{-1}$ and in this case $Fm_{NST1} = Fm_{NST2} = Fm_{NST} = 3224\ daN \cdot cm^{-1}$. In other embodiments using other cords or a smaller laying pitch, the force at break $Fm_{NST}$ is greater than or equal to 4000 $daN \cdot cm^{-1}$.

In another embodiment, each working cord is of the type 189.23 and of the structure (J+Q)×(A+C+B), where J=1, Q=6, A=3, C=9 and B=15, and comprises:
- an internal layer of the cord made up of J internal strand(s),
- an external layer of the cord made up of Q external strands wrapped helically around the internal layer of the cord,
- each internal and external strand comprising:
- an internal layer of the strand made up of A internal thread(s),
- an intermediate layer of the strand made up of C intermediate threads wrapped helically around the internal layer of the strand, and
- an external layer of the strand made up of B external threads wrapped helically around the intermediate layer of the strand.

There is then a force at break greater than or equal to 15 000 N, preferably greater than or equal to 20 000 N and more preferably greater than or equal to 25 000 N.

Hoop Reinforcement

Each hooping ply 40, 41 comprises metal hoop reinforcing elements (not shown), for example metal cords identical to the protective reinforcing elements, that make an angle at most equal to 10°, preferably in the range from 5° to 10°, with the circumferential direction Z of the tire 10. In this case, the angle is equal to 8°. The hoop reinforcing elements are crossed from one hooping ply 40, 41 to the other. Thus, in the embodiment illustrated, apart from the angle made by the reinforcing elements of each ply, the hooping plies and protective plies are identical.

Preferably, whether or not it is identical to the protective reinforcing elements, each hoop reinforcing element is made up of a metal cord that has a structure K'×(M'+P'), comprising a single layer made up of K' strands, each strand comprising:
- an internal layer of the strand made up of M' internal thread(s) and
- an external layer of the strand made up of NI P' external threads wrapped helically around the internal layer of the strand.

Each individual metal thread has a diameter in the range from 0.10 mm to 0.35 mm.

Each hoop reinforcing element exhibits a force at break Fr greater than or equal to 2500 N, preferably greater than or equal to 4000 N, more preferably greater than or equal to 6000 N and more preferably greater than or equal to 8500 N.

The pitch at which the hoop reinforcing elements of each hooping ply 42, 44 are laid ranges from 1.8 to 6.5 mm, preferably from 3.0 to 5.5 mm, and more preferably from 3.7 to 4.8 mm.

Each hooping ply 40, 41 exhibits a force at break $Fm_{NSF1}$, $Fm_{NSF2}$, respectively, greater than or equal to 1300 daN·cm$^{-1}$, preferably greater than or equal to 1500 daN·cm$^{-1}$, more preferably greater than or equal to 1800 daN·cm$^{-1}$ and even more preferably greater than or equal to 2000 daN·cm$^{-1}$.

In a variant, use may be made of hoop reinforcing elements different from those of the protective reinforcement.

Example of a Method for Manufacturing Cords of the Tires According to the Invention The metal cords are manufactured by cabling or else by twisting, using conventional methods known to a person skilled in the art.

Comparative Tests

A prior art tire T0, a control tire T1 and several tires P1 to P5 according to the invention were compared below. All of the tires T0 and P1 to P5 comprise two protective plies comprising protective reinforcing elements that are identical from one protective ply to the other, two working plies comprising working elements that are identical from one working ply to the other, and two hooping plies comprising hoop elements that are identical from one hooping ply to the other. The tire P1 is identical to the tire 10 described above. The tires P2 to P5 correspond to embodiments in which only the laying pitches of the protective and/or working reinforcing elements have been varied in order to vary the values of $Fm_{NSP1}=Fm_{NSP2}=Fm_{NSP}$ and $Fm_{NST1}=Fm_{NST2}=Fm_{NST}$. For each tire Pi, the relative percentage N of variation in $Fm_{NST}$ equal to $100 \cdot (Fm_{NST}(T1 \text{ or } Pi) - Fm_{NST}(T0))/Fm_{NST}(T0)$ has been indicated. In contrast to the tire T0 and to the tires P1 to P5, the tire T1 does not have a hoop reinforcement.

Each tire was tested in a working ply breakage test in which the tire was made to pass over an indenting feature having a hemispherical head with a diameter of several centimetres. On each passage, the indenting feature was raised by 5 mm until one of the working plies broke. The greater the height at which one of the working plies breaks (maximum height Hm), the more the tire is resistant to the action of the indenting feature. The maximum heights Hm measured are benchmarked against the maximum height Ho measured for the tire T0. The percentage given R is equal to the value $100 \cdot (Hm-Ho)/Ho$.

The characteristics of the various tires T0, T1 and P1 to P5 and the results of the breakage tests are collated in the following Table 1.

TABLE 1

| | $Fm_{NSP}$ (daN·cm$^{-1}$) | $Fm_{NST}$ (daN·cm$^{-1}$) | $Fm_{NSP}/Fm_{NST}$ | Hoop reinforcement | N (%) | R (%) |
|---|---|---|---|---|---|---|
| T0 | 616 | 2406 | 0.26 | Yes | 0 | 0 |
| T1 | 1016 | 3224 | 0.31 | No | 34 | 17 |
| P1 | 1632 | 3224 | 0.51 | Yes | 34 | 39 |
| P2 | 1016 | 2574 | 0.39 | Yes | 7 | 19 |
| P3 | 850 | 2406 | 0.35 | Yes | 0 | 15 |
| P4 | 1016 | 2189 | 0.46 | Yes | −9 | 12 |
| P5 | 1016 | 1660 | 0.61 | Yes | −31 | −1 |

It will be noted that the tires P1 to P5 according to the invention are all such that $Fm_{NSP}/Fm_{NST} \geq 0.27$ and even such that $Fm_{NSP}/Fm_{NST} \geq 0.30$ or even such that $Fm_{NSP}/Fm_{NST} \geq 0.35$, even such that $Fm_{NSP}/Fm_{NST} \geq 0.41$, or even such that $Fm_{NSP}/Fm_{NST} \geq 0.50$. Moreover, the tires P1 to P5 according to the invention are all such that $Fm_{NSP}/Fm_{NST} \leq 0.90$ or even such that $Fm_{NSP}/Fm_{NST} \leq 0.70$.

The results of the breakage tests on the tire P1 show that, for a relatively large rise in the value of $Fm_{NST}$ (34%), a relatively large rise in the maximum height is also obtained by increasing the value of $Fm_{NSP}$ such that $Fm_{NSP}/Fm_{NST} \geq 0.27$.

Moreover, the results of the breakage tests on the tires P2 and P3 show that, for a relatively small rise, or no rise in the value of $Fm_{NST}$ (7% et 0%), a significant rise in the maximum height (19% et 15%) is obtained by increasing the value of $Fm_{NSP}$ such that $Fm_{NSP}/Fm_{NST} \geq 0.27$.

In addition, the results of the breakage tests on the tire P4 show that, for a moderate drop in the value of $Fm_{NST}$ (−9%), a substantial rise in the maximum height (12%) is nevertheless obtained by increasing the value of $Fm_{NSP}$ such that $Fm_{NSP}/Fm_{NST} \geq 0.27$.

Finally, the results of the breakage tests on the tire P5 show that, for a relatively large drop in the value of $Fm_{NST}$ (−31%), there is virtually no impact on the maximum height (−1%) by increasing the value of $Fm_{NSP}$ such that $Fm_{NSP}/Fm_{NST} \geq 0.27$.

The comparison of the results of the breakage tests between the tires T0 and P3 shows that, for a fixed value of $Fm_{NST}$, the increase in the ratio $Fm_{NSP}/Fm_{NST}$ allows an increase in the maximum height of 15%. The comparison of the results of the breakage tests between the tires T0 and P4 shows that, for a drop in the value of $Fm_{NST}$, the increase in the ratio $Fm_{NSP}/Fm_{NST}$ nevertheless allows an increase in the maximum height of 12%.

The comparison of the tire T1 with the tires P3 and P4 shows that, although the $Fm_{NST}$ of the tires P3 and P4 are significantly lower than the $Fm_{NST}$ of the tire T1, a comparable maximum height is obtained for the same value of $Fm_{NSP}$ (case of P4) or for a value similar to the ratio $Fm_{NSP}/Fm_{NST}$ (case of P3).

Thus, in conclusion, a tire according to the invention exhibiting a ratio $Fm_{NSP}/Fm_{NST}$ greater than or equal to 0.27 associated with a hoop reinforcement makes it possible to increase the mechanical strength of the working plies with respect to indenting features while limiting the increase, or maintaining and even decreasing the mechanical strength of these working plies.

The invention is not limited to the embodiments described above.

Specifically, a protective reinforcement comprising several protective plies, only one of which exhibits a force at break $Fm_{NSP}$ such that the ratio $Fm_{NSP}/Fm_{NST}$ is greater than or equal to 0.27 may be conceivable within the scope of the invention.

Still within the scope of the invention, a working reinforcement comprising several working plies, only one of which exhibits a force at break $Fm_{NST}$ such that the ratio $Fm_{NSP}/Fm_{NST}$ is greater than or equal to 0.27 may be conceivable.

Still within the scope of the invention, a tire comprising:
a protective reinforcement comprising several protective plies, at least two of which exhibit different forces at break, for example by virtue of different reinforcing elements, and
a working reinforcement comprising several working plies, at least two of which exhibit different forces at break, for example by virtue of different reinforcing elements, may be conceivable, at least one protective ply exhibiting a force at break $Fm_{NSP}$ and at least one working ply exhibiting a force at break $Fm_{NST}$ such that the ratio $Fm_{NSP}/Fm_{NST}$ is greater than or equal to 0.27.

The invention claimed is:

1. A tire for a construction plant vehicle, the tire comprising:
a tread; and
a crown reinforcement arranged radially internal to the tread, the crown reinforcement including:
(1) a protective reinforcement that includes at least one protective ply that exhibits a force at break $Fm_{NSP}$ and that is a reinforcement of the tire that is closest radially to the tread, wherein each of the at least one protective ply exhibits a force at break $Fm_{NSP}$ greater than or equal to 1300 daN·cm$^{-1}$;
(2) a working reinforcement that includes at least one working ply that exhibits a force at break $Fm_{NST}$, the working reinforcement being arranged radially internal to the protective reinforcement, wherein each of the at least one working ply exhibits a force at break $Fm_{NST}$ greater than or equal to 2000 daN·cm$^{-1}$; and
(3) a hoop reinforcement that includes at least one hooping ply that exceeds a force at break $Fm_{NSF}$ greater than or equal to 1300 daN·cm$^{-1}$, each of the at least one hooping ply including hoop reinforcing elements that make an angle at most equal to 10° with a circumferential direction of the tire, the hoop reinforcement being arranged radially internal to the working reinforcement,
wherein the following condition is satisfied:

$0.50 \leq Fm_{NSP}/Fm_{NST} \leq 0.70$, and wherein the tire has a size according to a W R U type, where U≥49, and
wherein each protective reinforcing element comprises a metal cord having a structure K×(M+P), where K is a number of strands, and where each strand comprises (1) an internal layer comprising M internal threads and (2) an external layer comprising N external threads wrapped helically around the internal layer, and
wherein each hoop reinforcing element comprises a metal cord having the same K×(M+P) structure as the metal cord of the protective reinforcing element.

2. The tire according to claim 1, wherein each of the at least one protective ply exhibits a force at break $Fm_{NSP}$ greater than or equal to 1400 daN·cm$^{-1}$.

3. The tire according to claim 1, wherein each of the at least one protective ply exhibits a force at break $Fm_{NSP}$ greater than or equal to 1500 daN·cm$^{-1}$.

4. The tire according to claim 1, wherein each of the at least one protective ply exhibits a force at break $Fm_{NSP}$ greater than or equal to 1600 daN·cm$^{-1}$.

5. The tire according to claim 1, wherein each of the at least one protective ply includes protective reinforcing elements, and each of the protective reinforcing elements exhibits a force at break (Fr) greater than or equal to 3000 N.

6. The tire according to claim 1, wherein each of the at least one protective ply includes protective reinforcing elements laid at a pitch that ranges from 1.2 mm to 6.5 mm.

7. The tire according to claim 1, wherein each of the at least one working ply exhibits a force at break $Fm_{NST}$ greater than or equal to 2500 daN·cm$^{-1}$.

8. The tire according to claim 1, wherein each of the at least one working ply exhibits a force at break $Fm_{NST}$ greater than or equal to 3000 daN·cm$^{-1}$.

9. The tire according to claim 1, wherein each of the at least one working ply exhibits a force at break $Fm_{NST}$ greater than or equal to 4000 daN·cm$^{-1}$.

10. The tire according to claim 1, wherein each of the at least one working ply includes working reinforcing elements, and each of the working reinforcing elements exhibits a force at break (Fr) greater than or equal to 15000 N.

11. The tire according to claim 1, wherein each of the at least one working ply includes working reinforcing elements laid at a pitch that ranges from 2.5 mm to 7.5 mm.

12. The tire according to claim 1, wherein each of the at least one protective ply includes protective reinforcing elements, and the protective reinforcing elements make an angle at least equal to 10° with a circumferential direction of the tire.

13. The tire according to claim 1, wherein each of the at least one working ply includes working reinforcing elements, and the working reinforcing elements make an angle at most equal to 60° with a circumferential direction of the tire.

14. The tire according to claim 1, wherein the angle that the hoop reinforcing elements make with the circumferential direction of the tire is in a range from 5° to 10°.

15. The tire according to claim 1, wherein each of the at least one protective ply exhibits a force at break $Fm_{NSP}$ greater than or equal to 1400 daN·cm$^{-1}$, and
wherein each of the at least one working ply exhibits a force at break $Fm_{NST}$ greater than or equal to 2500 daN·cm$^{-1}$.

16. The tire according to claim 1, wherein each of the at least one protective ply exhibits a force at break $Fm_{NSP}$ greater than or equal to 1600 daN·cm$^{-1}$, and
wherein each of the at least one working ply exhibits a force at break $Fm_{NST}$ greater than or equal to 4000 daN·cm$^{-1}$.

17. The tire according to claim 16, wherein the at least one protective ply are plural in number,
wherein each of the at least one protective ply comprises protective reinforcing elements, and each of the protective reinforcing elements exhibits a force at break (Fr) greater than or equal to 3500 N,
wherein the protective reinforcing elements are laid at a pitch that ranges from 2.5 mm to 5.0 mm,
wherein the at least one working ply are plural in number,
wherein each of the at least one working ply comprises working reinforcing elements, and each of the working reinforcing elements exhibits a force at break (Fr) greater than or equal to 15000 N, wherein the working reinforcing elements are laid at a pitch that ranges from 3 mm to 7 mm, wherein the at least one hooping ply are plural in number, wherein each of the at least one hooping ply exhibits a force at break $Fm_{NSF}$ greater than or equal to 1500 daN·cm$^{-1}$, wherein each of the hoop reinforcing elements exhibits a force at break (Fr) greater than or equal to 2500 N, wherein the hoop reinforcing elements are laid at a pitch that ranges from 1.8 mm to 6.5 mm, and wherein U≥57.

18. The tire according to claim 17, wherein each of the protective reinforcing elements exhibits a force at break (Fr) greater than or equal to 5500 N, wherein the protective reinforcing elements are laid at a pitch that ranges from 3.5 mm to 4.5 mm, wherein the working reinforcing elements are laid at a pitch that ranges from 3.5 mm to 6.5 mm, wherein each of the at least one hooping ply exhibits a force at break $Fm_{NSF}$ greater than or equal to 2000 daN·cm$^{-1}$, wherein each of the hoop reinforcing elements exhibits a force at break (Fr) greater than or equal to 6500 N, and wherein the hoop reinforcing elements are laid at a pitch that ranges from 3.7 mm to 4.8 mm.

19. The tire according to claim 18, wherein each of the hoop reinforcing elements exhibits a force at break (Fr) greater than or equal to 8500 N, wherein the protective reinforcing elements make an angle in the range of 15° to 35° with the circumferential direction of the tire, wherein each of the M internal threads and the N internal threads of the metal cord of the protective reinforcing element have a diameter in the range of from 0.10 mm to 0.35 mm, wherein either (1) each working reinforcing element comprises a metal cord having a structure (J+Q)×(A+B) and comprising an internal layer comprising J internal strands, an external layer comprising Q external strands wrapped helically around the internal layer, each of the J internal strands and the Q external strands comprising an internal layer comprising A internal threads and an external layer comprising B external threads wrapped helically around the internal layer, with each of the A internal threads and the B external threads having a diameter in the range of from 0.10 mm to 0.35 mm, or (2) each working reinforcing element comprises a metal cord having a structure (J+Q)×(A+C+B) and comprising an internal layer comprising J internal strands, an external layer comprising Q external strands wrapped helically around the internal layer, each of the J internal strands and the Q external strands comprising an internal layer comprising A internal threads, an intermediate layer comprising C intermediate threads wrapped helically around the internal layer, and an external layer comprising B external threads wrapped helically around the intermediate layer, wherein the angle that the hoop reinforcing elements make with the circumferential direction of the tire is in a range from 5° to 10°.

20. The tire according to claim 19, wherein K=4, M=4, and P=9, and wherein (1) J=1, Q=6, A=3, and B=9 or (2) J=1, Q=6, A=3, C=9, and B=15.

21. The tire according to claim 20, wherein J=1, Q=6, A=3, C=9, and B=15.

22. The tire according to claim 20, wherein J=1, Q=6, A=3, and B=9.

* * * * *

UNITED STATES PATENT AND TRADEMARK OFFICE
CERTIFICATE OF CORRECTION

PATENT NO.        : 10,933,694 B2           Page 1 of 1
APPLICATION NO.   : 15/304976
DATED             : March 2, 2021
INVENTOR(S)       : Alain Domingo et al.

It is certified that error appears in the above-identified patent and that said Letters Patent is hereby corrected as shown below:

On the Title Page

Page 2, Column 2, Item (56) References Cited, U.S. PATENT DOCUMENTS:
Line 6, "6/2015 Barquet et al." should read --6/2015 Barguet et al.--

In the Specification

Column 9:
Line 8, "NI P' external" should read --P' external--

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*